(No Model.)
W. H. JOHNSON & J. B. GRANGER.
HAME FASTENER.
No. 425,080. Patented Apr. 8, 1890.
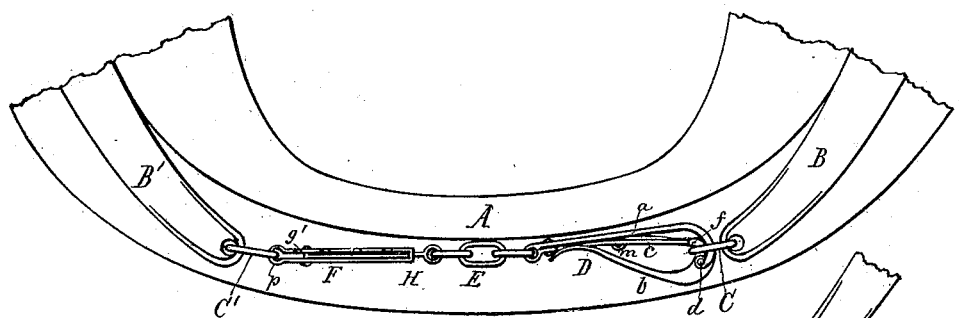
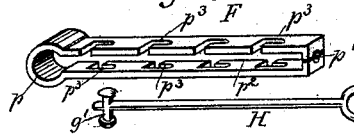 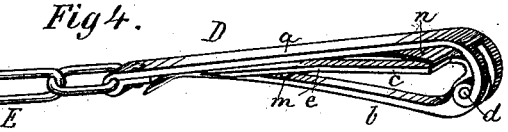
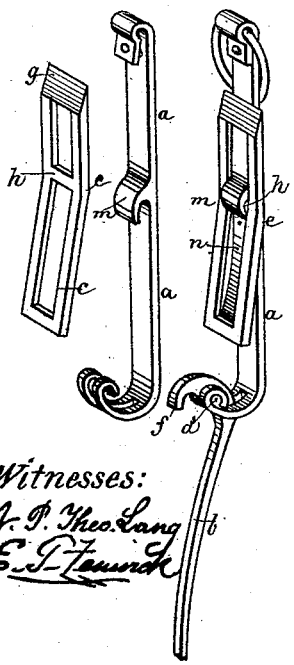  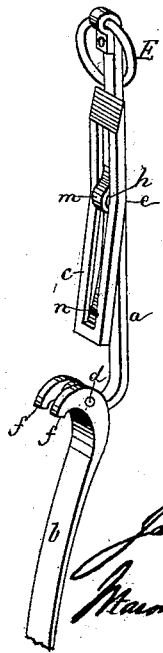 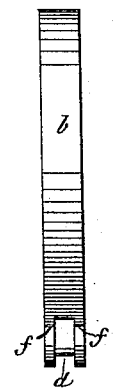 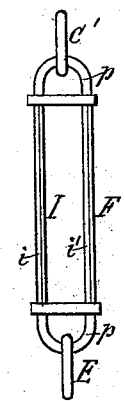
Witnesses:
Inventor:

UNITED STATES PATENT OFFICE.

WILLIAM H. JOHNSON AND JAMES B. GRANGER, OF DELHI, NEW YORK.

HAME-FASTENER.

SPECIFICATION forming part of Letters Patent No. 425,080, dated April 8, 1890.

Application filed January 2, 1890. Serial No. 335,715. (No model.)

*To all whom it may concern:*

Be it known that we, WILLIAM H. JOHNSON and JAMES B. GRANGER, citizens of the United States, residing at Delhi, in the county of Delaware and State of New York, have invented certain new and useful Improvements in Hame Fastening, Locking, and Adjusting Contrivances; and we do hereby declare the following to be a full, clear, and exact description of the invention, such as will enable others skilled in the art to which it appertains to make and use the same.

Our invention consists, first, in an improved hame-fastening locking mechanism, and, second, in a combination of a peculiar shortening or tension-adjusting contrivance and the locking mechanism, all as will be hereinafter described and claimed.

By the first feature of our invention the hames can be fastened upon the horse-collar by simply moving a lever in one direction, and when fastened it is impossible for them to come unlocked until the locking-tongue of the mechanism is raised out of its locking position, this construction also facilitating the unlocking of the hames, it being simply necessary in order to unlock the hames to raise the tongue and move the lever in a reverse direction to that in which it is moved to lock the same; and by the second feature of our invention the hames after or before being locked can be expeditiously shortened, so as to fit the collar as closely as necessary, and thus avoid rattling.

In the drawings, Figure 1 is a front view showing a portion of a horse-collar and a portion of the hames with our hame locking and shortening mechanism complete applied thereto, the fastening being locked. Fig. 2 is a side view of a portion of the hames, connecting-chain, and the locking mechanism, which latter is unlocked. Fig. 3 is a perspective view of one portion of the shortening or tension-adjusting contrivance. Fig. 4 is a perspective view of the hame-fastening locking mechanism, connecting-chain, and one portion of the shortening or tension-adjusting mechanism. Figs. 5, 6, 7, 8, 9, and 10 are detail views illustrating the parts of the hame-locking mechanism, in some of the said views the locking-lever and its fellow part being slightly changed in its construction from that shown in Figs. 2 and 3. Fig. 11 is another style of shortening or tension-adjusting contrivance which may be used with the hame-locking mechanism.

A in the drawings represents the horse-collar, and B B' the hames. To the ends of the hames the rings C C' are connected, and between these rings the hame-fastening locking mechanism D, the connecting-chain links E, and shortening or tension-adjusting contrivance F are applied, the fastening and locking mechanism being connected to the ring C and the shortening or tension-adjusting contrivance to the ring C'.

The fastening and locking mechanism D comprises a jointed hook formed of two parts $a$ and $b$ and provided with a locking-tongue $c$. The part $a$ of the hook is at one end cold-shut loosely upon a chain-link E, so as to articulate freely, and at its other end, which is bifurcated, curved around downwardly, as shown, and the part $b$ is curved around upwardly at one end and passed between the jaws of the bifurcated curved end of the part $a$ and pivoted at $d$ to the part $a$, as shown. The curvature of the part $b$ is such that its upper end $f$ extends forward beyond the pivot $d$ a short distance, as shown, and thus forms a locking-abutment for the tongue $c$ when the parts are in the locked position shown in Fig. 1. The forward end of the part $b$ is left free, and is bent upward in a curved form, so as to bear against the under side of the forward portion of the part $a$, as shown in said Fig. 1. The tongue $c$ is bent slightly between its ends, as indicated at $e$, and formed, preferably, with a beveled bearing-surface $g$ at its inner end. This tongue is in form of a skeleton frame, and at its angle or bend $e$ a cross-bar $h$ is provided, and by means of this bar it is connected to a hooking-lug $m$, formed on the under side of the part $a$ of the hook of the fastening and locking mechanism D, as more plainly shown in Fig. 9. Thus connected to the parts, the tongue $c$ is free to articulate on its cross-bar $h$ in the lug $m$. It is contemplated to have the tongue adjust itself by gravity, so as to abut with its outer end against the locking-abutment at the end $f$ of the part $b$; but, if desirable, a spring $n$ may be applied on the part $a$ and bear with its free rear end against the rear end portion of the tongue, and thus aid the gravity of the tongue in adjusting the tongue to a position in contact with the abutment end *f* of the part *b*. The forward end of the long arm of the lever-like part *b* of the hook, formed of parts *a* and *b*, when bearing against the under side of the part *a*, will strike against the inner or beveled forward portion *g* of the tongue, and thereby further force the outer or rear end of the tongue against the abutment, as well as retain it in that position until the hames are unlocked, which is accomplished by pressing up and raising the locking-tongue, and thereafter moving the lever downward and backward, as illustrated in Fig. 2 and also in Figs. 7 and 9.

From Fig. 2 it will be apparent that to connect the portions of the hames it is only necessary to turn the lever-like part *b* backward and pass its free end through the ring C and to draw the hames around the collar and fasten and lock the same to move the lever-like part *b* from the position shown in Fig. 2 to the position shown in Fig. 1, this latter operation insuring an automatic locking of the hames by the tongue *c*, from which locked position there can be no change until the locking-tongue is raised and unlocked. Instead of bifurcating the part *a* of the hook, the lever portion *b* may be bifurcated and the part *a* passed between the jaws of the bifurcated portion of part *b*, as shown in Fig. 9.

In Fig. 3 a connection F is formed with a link-eye *p*, a rod-eye *p'*, openings *p²* along its sides, and with coinciding L-shaped notches *p³* in the inner edge on one side and in the outer edge on the opposite side. This connection turns loosely on the ring C'.

In Fig. 4 a rod H, having a bolt *g'* with a T-head at each end, is shown connected loosely by its ring end to a chain-link E. This rod is inserted between the top and bottom straps of the connection F, and by partially turning and then adjusting it from one to the other of the L-shaped notches the hames can be shortened or the tension of the same upon the collar adjusted, and then by moving the double-headed bolt into the proper notch this adjustment can be retained. The notches on one strap-plate are placed on coinciding transverse lines with those on the other, so as to permit necessary adjustments, as circumstances may require.

Instead of using the adjusting contrivance shown in Figs. 3 and 4, a double or extensible link I might be adopted, the part *i* of said link moving with a frictional bind upon the part *i'*, or the parts can be fastened in position by a spring-pin or other proper means.

It is contemplated to have the tongue *c* made with a spring action and to rivet its rearward end to the under side of the part *a* of the hook, and then, if necessary, place an auxiliary spring, as *n*, above it. Thus constructed, the pivotal movement or articulation at *m* would be unnecessary. However, we prefer the pivotal or articulation movement of the tongue, as illustrated in the drawings.

The shortening or adjusting contrivance may consist of a strap or chain connection with an ordinary buckle or other suitable adjusting device, such strap being connected to the inner end of the fastening-locking hook and to a ring C' of the hame.

What we claim as our invention is—

1. The within-described hame-fastener, comprising, in combination, a jointed drawing and connecting hook *a* and *b*, an abutting tongue *c*, and suitable connections between the hook and the hames, the said tongue lying lengthwise of and attached to the part *a* of the hook, and capable of vibrating vertically and in conjunction with the abutment end of the drawing and locking lever-like part *b* of the hook, serving for automatically locking the hame-fastening when said part *b* is closed against the said part *a*, substantially as described.

2. The combination of the bent articulating and abutting tongue *c*, arranged lengthwise of the hook and adapted to vibrate vertically in the open-joint lug *m* on the part *a* of the hook, with the parts *a* and *b*, jointed together at *d*, substantially as described.

3. The combination, with the parts *a* and *b* of the hook and suitable connections between the hook and the hames, of the longitudinally-lying, vertically-vibrating, and abutting locking-tongue *c* and a spring *n*, substantially as described.

4. The combination, with the lever part *b* of the hame-fastening hook formed with an abutment end *f*, of the part *a*, formed with jaws, between which said end is extended, and the longitudinally-arranged and vertically-vibrating abutting locking-tongue *c*, substantially as described.

5. The combination of the hame-fastening hook *a b c*, the described two-part adjusting-connection F, and suitable means for connecting the said hook and connection with the hames, substantially as described.

6. The within-described hame-adjusting contrivance, consisting of the connection F, formed with a link-eye *p*, a rod-eye *p'*, openings *p²* along its sides, and L-shaped notches *p³*, in combination with the rod H, having a T-headed bolt *g'*, and with a suitable connection, as E, of a hame-fastening, substantially as described.

In testimony whereof we hereunto affix our signatures in presence of two witnesses.

WILLIAM H. JOHNSON.
JAMES B. GRANGER.

Witnesses:
W. G. EDGERTON,
GEO. A. STURGES, Jr.